United States Patent [19]

Mori et al.

[11] Patent Number: 4,832,982
[45] Date of Patent: May 23, 1989

[54] LASER PROCESS FOR FORMING DISPERSION ALLOY LAYER FROM POWDER ON METALLIC BASE

[75] Inventors: Kazuhiko Mori, Toyota; Katsuhiko Ueda, Aichi; Soya Takagi; Minoru Kawasaki, both of Toyota, all of Japan

[73] Assignee: Toyota Jidosha Kabushiki Kaisha, Japan

[21] Appl. No.: 129,303

[22] Filed: Dec. 7, 1987

[30] Foreign Application Priority Data

Dec. 8, 1986 [JP] Japan .................................. 61-292055

[51] Int. Cl.$^4$ .......................... B05D 3/06; B23K 9/00; B22F 7/04; B32B 15/02
[52] U.S. Cl. ............................ 427/53.1; 219/121.61; 219/121.66; 219/121.8; 428/556; 428/558; 428/564
[58] Field of Search ................. 427/53.1, 35; 219/121.61 LA, 121.66 LF, 121.79 LV, 121.80 LW; 428/552, 556, 558, 564, 565

[56] References Cited

U.S. PATENT DOCUMENTS

| T967,009 | 2/1978 | Gale | 427/53.1 |
|---|---|---|---|
| 4,269,868 | 5/1981 | Livsey | 427/53.1 |
| 4,299,860 | 11/1981 | Schaefer et al. | 427/53.1 |
| 4,537,793 | 8/1985 | Kehrer et al. | 427/53.1 |
| 4,725,708 | 2/1988 | Kawasaki et al. | 427/53.1 |
| 4,746,540 | 5/1988 | Kawasaki et al. | 427/53.1 |

FOREIGN PATENT DOCUMENTS 57-32373 2/1982 Japan .
61-296973 6/1985 Japan .

Primary Examiner—Michael Lusignan
Assistant Examiner—Marianne L. Padgett
Attorney, Agent, or Firm—Finnegan, Henderson, Farabow, Garrett & Dunner

[57] ABSTRACT

Herein disclosed is a process for forming a dispersion alloy layer on a metallic base. The powder of an alloy system, which will separate into two or more multi-liquid phases at a temperature equal to or higher than its melting point and will solidify, when quenched, with its individual liquid phases being separate and in which the ratio of the minimum to the maximum specific weight its individual liquid phases is 0.3 or higher, such as the powder of any alloy system of Cu-Ni(15%)-Fe(8%)-Si(3%)-B(1.5%) is applied to a metallic base. The powder thus applied is then melting and agitated while being irradiated with a laser beam oscillated. The agitated melt of the powder is then quenched to solidify with the movement of the laser beam thereby to form on the metallic base the dispersion alloy layer in which the solid particles of at least one of those phase such as silicide particles are dispersed in the matrix of the remaining one of the phases.

6 Claims, 7 Drawing Sheets (x10)

(x10)

(x10)

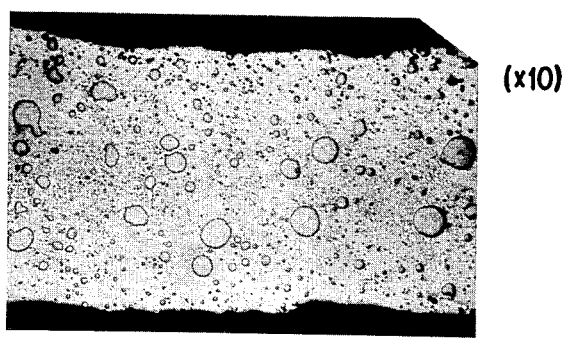
FIG. 10 (x10)
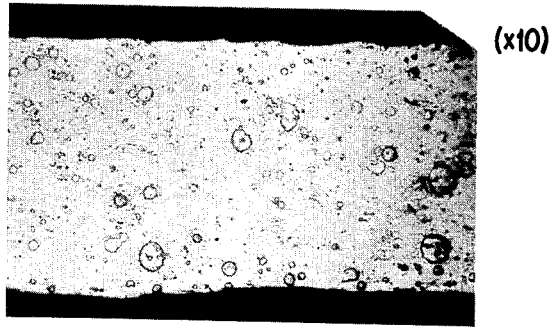
FIG. 11 (x10)
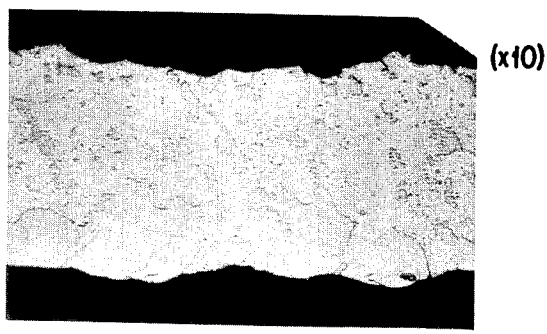
FIG. 14 (x10)

LASER PROCESS FOR FORMING DISPERSION ALLOY LAYER FROM POWDER ON METALLIC BASE

BACKGROUND OF THE INVENTION

1. Field of the Invention

The present invention relates to a technique for improving the characteristics such as the wear resistances of the surfaces of metallic parts such as automotive parts, e.g., camshafts or crankshafts or a variety of other mechanical parts and, more particularly, to a process for forming a dispersion alloy layer on a metallic base made of steel, cast iron, aluminum alloy or the like.

2. Description of the Prior Art

A dispersion alloy is prepared by dispersing particles of carbides, oxides, nitrides or hard metals in a metallic matrix. The dispersion alloy thus prepared is hard and has an excellent wear resistance so that it has been widely used as a reinforced alloy in a member required to have the wear resistance.

The most common one for preparing those reinforced dispersion alloys is the precipiration process for heat-treating a supersaturated solid solution, in which an element composing a dispersion phase is dissolved over the solid solution limit of a matrix metal at a room temperature, to precipitate the dispersion phase. Another known is the sintering process for compressing and sintering the mixture of powder forming the matrix and powder forming the dispersion phase. Also known is the internal oxidization, nitrization or carbonization process which uses a material containing a metal more reactive with oxygen, nitrogen or carbon, respectively, than the matrix metal. This material is held at a high temperature in oxidizing, nitriding or carbonizing gases so that these gases may be allowed to diffuse into the material to form the oxide, nitride or carbide in the material.

In another aspect, there are also known processes for forming a dispersion alloy layer locally in the surface of a metallic base. As is disclosed in Japanese Patent Laid-Open No. 32373/1982, for example, the surface layer of a metallic base is melted with a TIG arc or the like, and non-metallic powder such as oxide powder is blown and mixed into the molten pool to form in the base surface layer a layer in which the non-metallic particles are dispersed in the metal. Another but similar process using a laser beam in place of the TIG arc is disclosed in U.S. Pat. No. 4,299,860. In this connection, we have already proposed in Japanese patent application No. 137488/1985 a process for forming a dispersion alloy layer locally in the surface of a metallic base, by arranging the surface of the metallic base with powder of a metal having a higher affinity with oxygen than that base metal, by melting and mixing the powder and the surface layer of the metallic base with a highly concentrated energy such as a laser beam in the atmosphere of oxidizing gases to oxidize the metal of the powder thereby to form a dispersion alloy layer in which the oxide phase is dispersed.

Generally speaking, the excellent wear resistance required of metallic members used in the various mechanical parts is limited to merely a local portion of the metallic members, and the wear resistance per se is one of the properties belonging to the surface. It follows that it is frequently sufficient to give an excellent wear resistance exclusively to the surface layer. On the other hand, the dispersion alloy has a higher production cost than the ordinary alloys and is so hard that it is inferior in workability. As a result, a metallic member made of the dispersion alloy in its entirety would frequently be disadvantageous in the workability and production cost. It is, therefore, frequently desired that the member be made of the reinforced dispersion alloy not in its entirety but locally at its surface layer where the wear resistance is demanded. This tendency is prominent especially in the case of large-sized parts.

From the standpoint of the characteristics of the dispersion alloy, on the other hand, the dispersion-phase particles usually have the higher hardness for the finer size. From the standpoint of the wear resistance especially for the sliding friction, on the contrary, excessively fine dispersion-phase particles (of 10 $\mu$m or smaller, for example) would be unable to ensure a sufficient wear resistance. It is, therefore, desirable that particles of a considerable size (of about 10 to 100 $\mu$m) be dispersed.

Thus, examinations of the dispersion alloy making processes of the prior art have been conducted mainly from those standpoints to reveal that none of the processes could satisfy the above-specified demands sufficiently and could be freed from various drawbacks, as will be described in the following.

First of all, the precipitation process for precipitating the dispersion-phase particles by the heat treatment of a long time finds difficult the local reinforcement by the dispersion. Since the growth of the precipitate is promoted by the diffusion in the solid, the size of the precipitate is several microns at most even after the long heat treatment, and the fact is that sufficient sliding-wear resisting characteristics are not always obtained. Another problem is that the treatment itself takes a long time.

Next, the sintering process is allowed to set the size of the dispersion-phase particles freely because the mixed powder is compressed and sintered. Despite of this advantage, however, the sintering process is premised on the assumption that the material is made of a dispersion alloy as a whole for the compressing and sintering steps. This makes it difficult to form the dispersion alloy layer locally. Another problem is that the sintering step also takes a long time.

On the other hand, the internal oxidizing, nitriding or carbonizing process also requires a long time for the treatment because the diffusion of the gases in the solid is the determining rate. In addition, the necessity for the integral heating makes it difficult to form the dispersion alloy layer locally.

All the processes disclosed in Japanese Patent Laid-Open No. 32373/1982, U.S. Pat. No. 4,299,860 and Japanese patent application No. 137488/1985 are directed to the technique for forming the dispersion alloy layer locally. These processes are satisfactory in the point of local formation but are accompanied by the following problems, respectively.

The process of Japanese Patent Laid-Open No. 32373/1982 or U.S. Pat. No. 4,299,860 includes the step of merely blowing the non-metallic powder into the molten pool. As a result, the particles of the non-metallic powder are not dispersed uniformly in the metallic matrix but are frequently localized or agglomerated to raise a problem that a sufficient wear resistance is hardly attained. The dispersion-phase matrix metal is necessarily restricted to become identical to the parent material (or the base). This leads to another problem that the characteristics of the dispersion alloy layer never fail to be limited by the characteristics of the metal making the base.

On the other hand, the process of Japanese patent application No. 137488/1985 is accompanied by the reaction between the molten metal and the gases so that the size of the dispersion-phase particles is several microns at most to raise a problem that the sufficient sliding-wear resisting characteristics cannot be attained. Like the aforementioned process of Japanese Patent Laid-Open No. 32373/1982, the outstanding process is restricted by the fact that the matrix metal of the dispersion alloy layer necessarily has to be identical to the base portion.

SUMMARY OF THE INVENTION

The present invention has been conceived in view of the background thus far described and has an object to provide a process which can form such a dispersion alloy layer locally in the surface of metallic base at a desired location for a remarkably short time as is given sufficient sliding-wear resisting characteristics by enlarging the diameter of the dispersion-phase particles to some extent and dispersing the same uniformly and as is freed from any restriction upon the parent material.

In order to achieve the above-specified object, we have conducted a variety of experiments and examinations, aiming at forming a dispersion alloy layer having dispersion phases of uniform and moderate sizes by applying the process for forming a cladding layer on a metallic base with a laser beam having highly concentrated energy. Our experiments and examinations have revealed that the object of the present invention can be achieved by using such an alloy system as will separate into two or more multi-liquid phases at a temperature equal to or higher than its melting point and will solidify, when quenched, while maintaining its separate state and by properly controlling the melting and agitating conditions with the laser beam.

According to the feature of the present invention, there is provided a process for forming a dispersion alloy layer on a metallic base, comprising the steps of: applying to a metallic base either alloy powder made of an alloy system, which will separate into two or more multi-liquid phases at a temperature equal to or higher than its melting point and will solidify, when quenched, with its individual liquid phases being separate and in which the ratio of the minimum to the maximum specific weight of the separately solidifying liquid phases is 0.3 or higher, or mixed powder which can compose said alloy system; irradiating the alloy or mixed powder on said metallic base with a laser beam to melt the same, while oscillating said laser beam with a frequency of 10 to 500 Hz in a direction generally perpendicular to a primary relative moving direction to agitate the melt of said alloy or mixed powder on said metallic base; and moving said laser beam in said primary relative moving direction relative to said metallic base to quench said melt to solidify at a quenching rate of $10^3$ deg/sec or higher thereby to form on said metallic base a dispersion alloy layer in which the solid particles of at least one of said phases are dispersed in the matrix of the remaining one of said phases.

Here, the laser beam used for the irradiation of the powder on the metallic base is desirably focused to have a diameter within a range of 0.5 to 5.0 mm and an energy concentration within a range of $1 \times 10^2$ to $2 \times 10^4$ W/mm². The relative moving velocity of the laser beam in the primary relative moving direction is desirably set within a range of 450 to 2,000 mm/min.

BRIEF DESCRIPTION OF THE DRAWINGS

FIG. 4A presents the case according to the present invention, in which the agitation by the oscillations of the laser beam is sufficient with a sufficient solidification rate; FIG. 4B presents the case of insufficient agitation or a low solidification rate; and FIG. 4C presents the case of no agitation and a sufficiently low solidification rate by the oscillations of the laser beam.

FIGS. 7, 8, 9, 10 and 11 present the photographs (of ten magnifications) of the sectional structures of the dispersion alloy layers formed by Examples 1, 2, 3, 4 and 5, respectively;

FIG. 14 is the photograph (of ten magnifications) of the sectional structure of the dispersion alloy layer in case of the agglomeration of the dispersion phase.

DESCRIPTION OF THE PREFERRED EMBODIMENTS

In the process of the present invention, generally speaking, either alloy powder or mixed powder for forming a dispersion alloy layer is applied to a metallic base and is melted on the metallic base by the irradiation with a laser beam. The melt of the powder is agitated by oscillating (or reciprocating) the laser beam in a direction generally perpendicular to a primary relative moving direction (or in a bead proceeding direction). The melt thus agitated is then quenched to solidify by the primary movement of the laser beam relative to the metallic base thereby to form a dispersion alloy layer metallurgically bound to the metallic base.

Figure 4A:
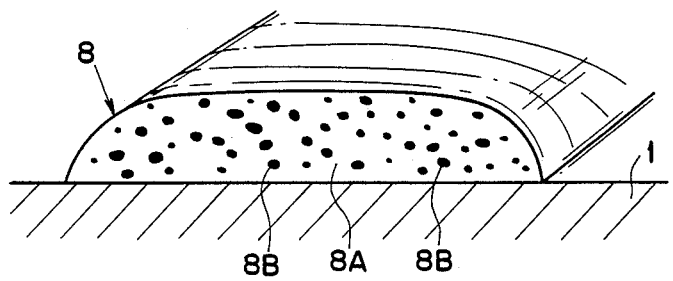
In FIGS. 4A, 4B and 4C are schematic sections showing the situations of alloy layers formed on a metallic base under different treating conditions, respectively.

Here, the melt of the powder applied to the metallic base and prepared by the laser beam is separated into two or more multi-liquid phases. Of these multiple liquid phases, one is the liquid phase of a metal or alloy for finally forming the matrix of the dispersion alloy layer, and others are the liquid phases for forming the dispersion-phase particles of the dispersion alloy layer. The melt in this multi-liquid phase state is intensively agitated by the aforementioned oscillations of the laser beam. As a result of this agitation, the two or more multi-liquid phases are left separate as if oil were agitated in water, until the liquid phases for finally forming the dispersion-phase particles are dispersed generally in the form of balls in the liquid phase of the matrix. The particles in the dispersion liquid phase have a size of about 10 to 100 μm. With the liquid phases thus being uniformly dispersed as a result of the oscillations of the laser beam, this beam is moved (i.e., in the primary relative movement) relative to the metallic base. In the portion which is not irradiated with the laser beam having moved away, the melt has its heat abruptly diffusing to the metallic base so that it is quenched to solidify at a high rate. As a result, the liquid phases for forming the dispersion phases solidify, while being dispersed in the phase for forming the matrix, to form the dispersion alloy layer in which the dispersion phases having the particle size of about 10 to 100 μm are uniformly dispersed. The dispersion alloy layer thus formed is schematically illustrated in FIG. 4A. In the dispersion alloy layer 8 formed on the metallic base 1, as seen from FIG. 4A, the dispersion-phase particles 8B having ball or similar shapes are uniformly dispersed in the matrix phase 8A.

The alloy or mixed powder to be used in the process thus far described has to be an alloy system which will separate into two or more multi-liquid phases at a temperature of its melting point or higher and in which the ratio of the minimum to the maximum specific weight of the liquid phases is 0.3 or higher. At a ratio lower than 0.3, the individual liquid phases have a tendency to separate upward and downward due to the difference of the specific weights even if the melt is agitated by oscillating the laser beam, so that the uniform dispersion state cannot be achieved. This raises the aforementioned necessity for the ratio of the specific weights of the liquid phases to be 0.3 at the lowest so that the agitating effect of the oscillations of the laser beam may be exhibited to disperse the liquid phases for the dispersion-phase particles uniformly in the liquid phase for the matrix thereby to make, as the final product, the dispersion alloy in which the dispersion-phase particles are uniformly dispersed. In the case of separation into two liquid phases, for example, the ratio of $\rho_D/\rho_M$ is set at 0.3 or higher for $\rho_D < \rho_M$ whereas the ratio of $\rho_M/\rho_D$ is set at 0.3 or higher for $\rho_M < \rho_D$, if the specific weight of the liquid phase for the dispersion phase is denoted at $\rho_D$ and the specific weight of the liquid phase for the matrix is denoted at $\rho_M$.

On the other hand, the range of the oscillation frequency of the laser beam also plays an important role for the uniform agitation. With the oscillation frequency ranging from 10 Hz to 500 Hz, the liquid phases for the dispersion phase can be prevented from any agglomeration to form the dispersion alloy layer having the dispersion-phase particles uniformly dispersed. An oscillation frequency lower than 10 Hz will cause weak agitation to agglomerate the liquid phases for the dispersion phase. On the contrary, an oscillation frequency higher than 500 Hz will invite the irradiation with the laser beam, as if the irradiation were statistically uniform. As a result, sufficient agitation cannot be effected so that the liquid phases for the dispersion phase will agglomerate like the case of the frequency below 10 Hz.

Figure 5:
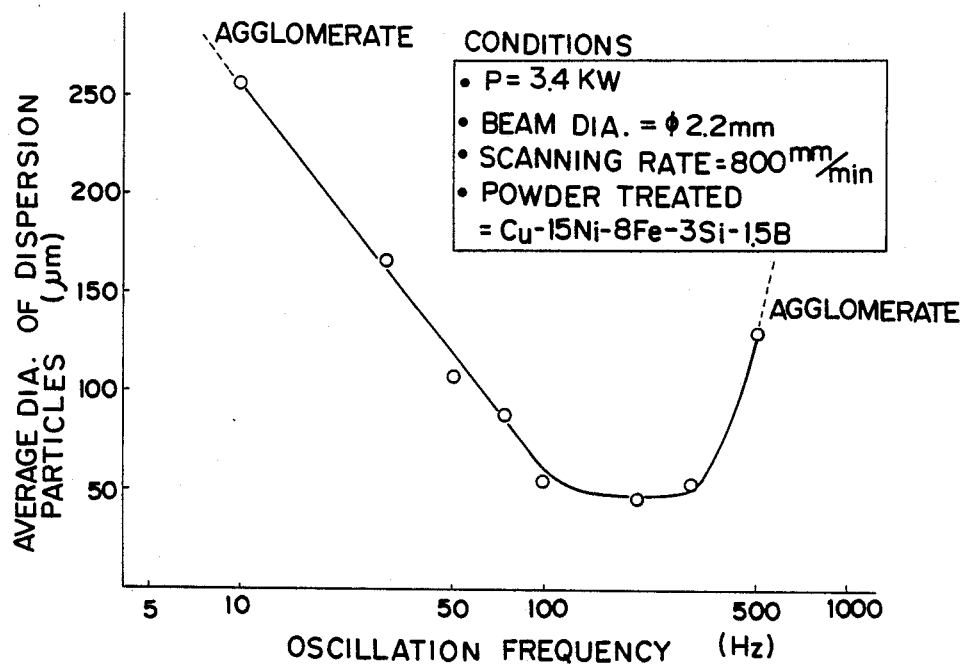
FIG. 5 plots the correlations between the oscillation frequency of the laser beam and the diameter of the dispersion-phase particles in the dispersion alloy layer.

FIG. 5 presents our experimental results of the relations between the oscillation frequency and the diameter of the dispersion-phase particles in the dispersion alloy layer. In these experiments: the output of the laser beam was 3.4 KW: the beam diameter 2.2. mm; the primary relative moving velocity of the beam 800 mm/min; and the powder used an alloy system of Cu-Ni(15%)-Fe(8%)-Si(3%)-B(1.5%) like a later-described Example 1. Moreover, the dispersion-phase particles in the experiments were a silicide system of Ni-Fe-Si. It is apparent from FIG. 5 that the dispersion phase could be prevented from any agglomeration by setting the oscillation frequency within the range of 10 to 500 Hz and that the diameter of the dispersion-phase particles could be controlled by changing the oscillation frequency within that range.

On the other hand, the quenching rate for solidification plays an important role for the liquid phases for the dispersion phase to solidify while remaining in their dispersion state, as described above. Hence, it is necessary that the melt be abruptly quenched to solidify at a rate equal to or higher than $10^3$ deg/sec. At a lower quenching rate, the dispersion phase will agglomerate again after the agitation by the oscillated laser beam so that no uniform dispersion phase can be established. Since the quenching step is conducted by way of the thermal diffusion to the metallic base, its rate can be adjusted in terms of the primary moving velocity of the laser beam relative to the metallic base, i.e., the bead proceeding velocity (or the beam scanning rate). If the primary relative moving velocity is set at 450 to 2,000 mm/min, as will be described later, a quenching rate equal to or higher than $10^3$ deg/sec can be achieved. The upper limit of the quenching rate is practically about $10^{10}$ deg/sec at the highest, although not specified.

As has been specified hereinbefore: the alloy system is so selected that the ratio of the specific weights of two or more liquid phases in the separate state at a temperature not lower than the melting point is not lower than 0.3; the agitation is conducted with an oscillation frequency of 10 to 500 Hz of the laser beam in a direction perpendicular to the beam proceeding direction; and the quenching rate is no lower than $10^3$ deg/sec. Then, it is possible to form the dispersion alloy layer in which the dispersion-phase particles 3B are uniformly dispersed in the matrix phase 8A, as shown in FIG. 4A.

Figure 4B:
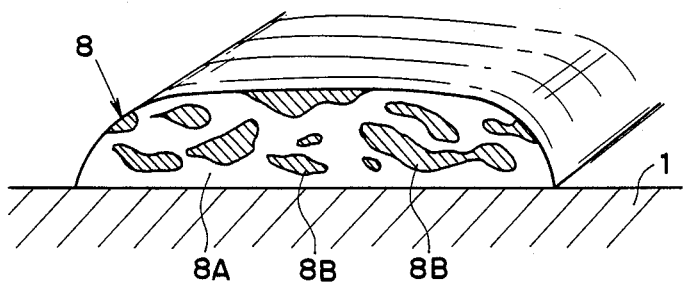
Figure 4C:
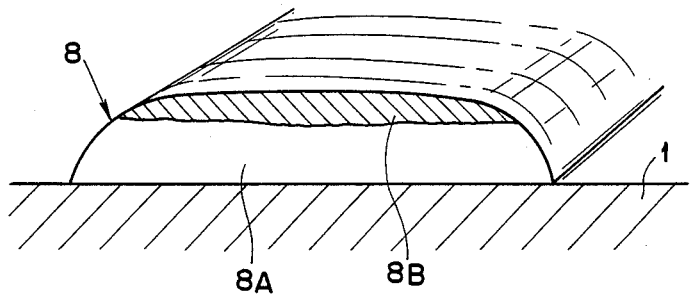

For reference, the situation of the treated layer either in case the agitation by the oscillations of the laser beam is insufficient or in case the quenching rate for the solidification is low is schematically shown in FIG. 4B. In this case, the phases 8B for forming the dispersion particles agglomerate to establish no uniform dispersion. The situation of the treated layer in the case of no oscillation of the laser beam, i.e, in the case of the static melting and solidification is also schematically shown in FIG. 4C. In this case, on the other hand, the phase 8A for the matrix and the phase 8B for the dispersion particles separate upward and downward due to the difference of their specific weights to form no dispersion alloy.

The desired conditions for the present invention other than the above-specified individual ones will be described in the following.

First of all, the diameter of the laser beam to be applied the alloy or mixed powder applied to the metallic base is desired to be 0.5 to 5.0 mm. With a beam diameter less than 0.5 mm, plasma is generated to make it difficult to melt the powder uniformly. With a beam diameter more than 5.0 mm, on the contrary, the effect of agitating the molten layer by the oscillations in the direction perpendicular to the beam proceeding direction is not sufficient, but no homogeneous dispersion alloy layer may possibly be formed due to the re-agglomeration.

On the other hand, the enery concentration of the laser beam is desired to range from $1 \times 10^2$ W/mm$^2$ to $2 \times 10^4$ W/mm$^2$. With an energy concentration lower than the lower limit, the alloy or mixed powder applied to the metallic base is difficult to sufficiently melt and agitate thereby to form the dispersion alloy layer. With an energy concentration higher than the upper limit, on the contrary, generation of the plasma grows so intense as to make it difficult to melt the powder uniformly.

Moreover, the primary moving velocity of the laser beam relative to the metallic base, i.e., the beam proceeding velocity (or the beam scanning rate) is desired to be within a range of 450 to 2,000 mm/min. At a beam proceeding velocity lower than 450 mm/min, a quenching rate not lower than $10^3$ deg/sec becomes difficult to achieve. As a result, the liquid phases to be dispersed at the quenching step after the melting and agitating steps caused by the irradiation and oscillations of the laser beam may possibly re-agglomerate to form no homogeneous dispersion alloy layer. At a velocity higher than 2,000 mm/min, on the contrary, the treated portion may possibly crack to form no strong dispersion alloy layer.

Figure 6:
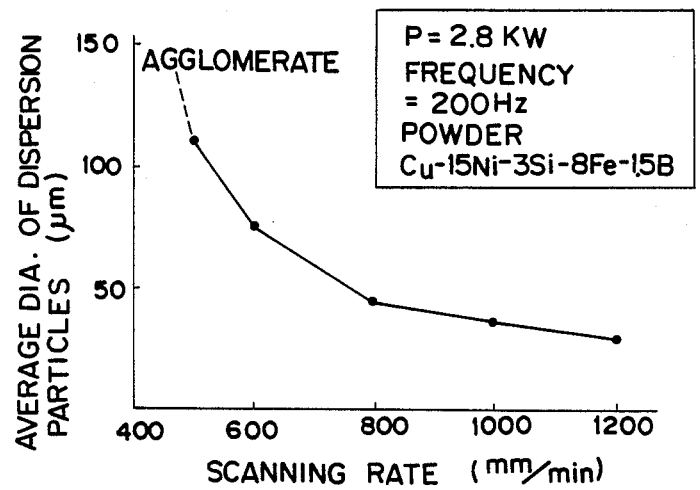
FIG. 6 plots the correlations between the scanning rate of the laser beam and the diameter of the dispersion-phase particles in the dispersion alloy layer.

FIG. 6 plots the experimental results of the relations between the primary moving velocity (or scanning rate) of the laser beam relative to the metallic base and the average diameter of the dispersion-phase particles in the dispersion alloy layer. In these experiments: the laser beam output was 2.8 KW; the laser beam diameter was 1.5 mm; the oscillation frequency was 200 Hz; the powder used for the treatment was the alloy system of Cu-Ni(15%)-Fe(8%)-Si(3%)-B(1.5%) like the later-described Example 1; and a silicide system for Fe-Ni-Si was dispersed as the dispersion-phase particles. In view of FIG. 6, it is found that the liquid phases for the dispersion phase can be prevented from any re-agglomeration by setting the primary relative moving velocity at 450 mm/min or higher and that the size of the dispersion-phase particles can be controlled by changing the primary relative moving velocity. The photograph of the sectional structure of the dispersion alloy layer, in case the primary moving velocity (or scanning rate) of the laser beam relative to the metallic base was set at 400 mm/min in the experiments of FIG. 6, is presented in FIG. 14. As seen from the photograph, it is apparent that the dispersion-phase particles agglomerate to establish no uniform dispersion state.

The items necessary for embodying the present invention will be described in detail in the following.

Figure 1:
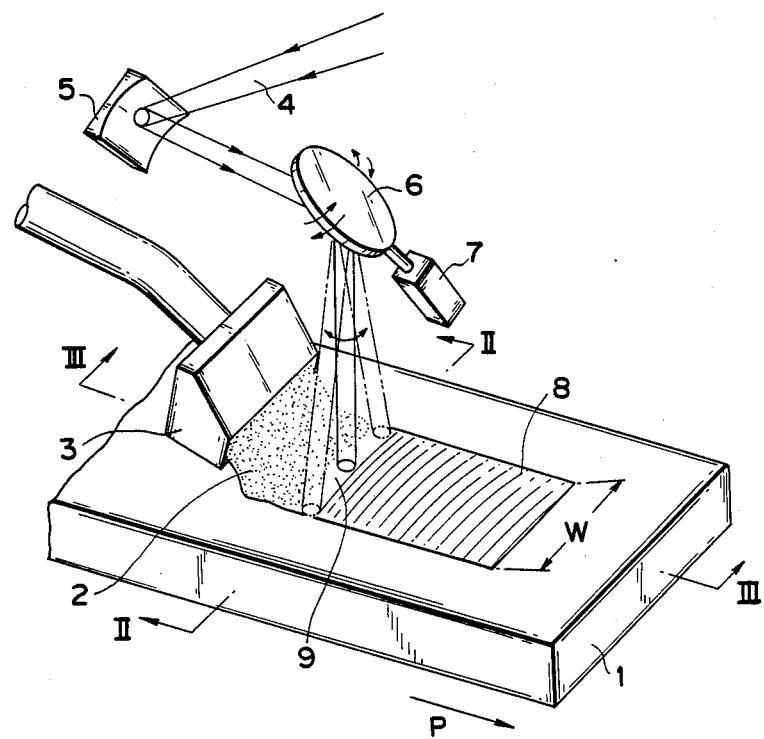
FIG. 1 is a schematic perspective view showing one example of the situation for practising the process of the present invention.
Figure 2:
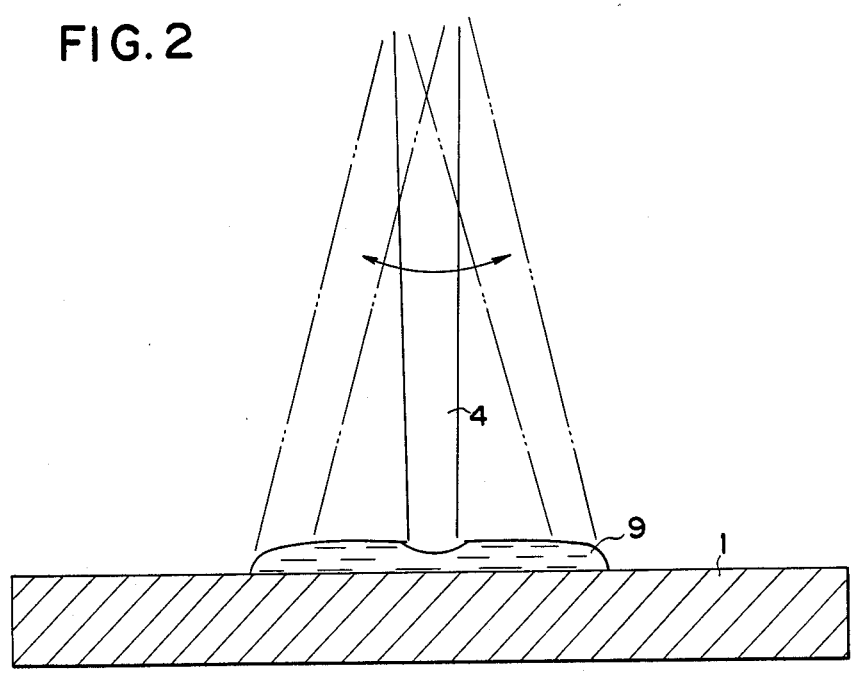
FIG. 2 is an enlarged section taken along line II—II of FIG. 1.
Figure 3:
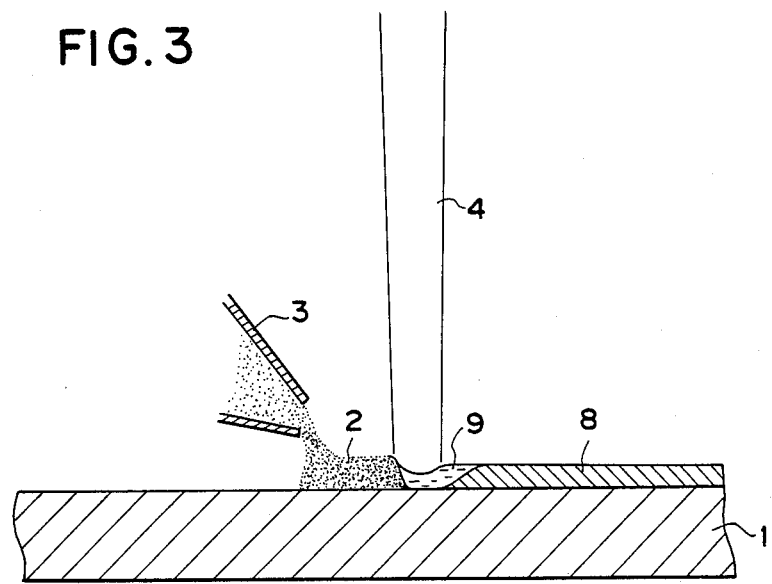
FIG. 3 is also an enlarged section but taken along line III—III of FIG. 1.

FIGS. 1 to 3 show one embodiment of the process according to the present invention.

In FIGS. 1 to 3, a metallic base 1 is continuously moved rightwardly of the drawings, as indicated at arrow P, at a velocity of 450 to 2,000 mm/min. To this metallic base 1 from a not-shown hopper, there is continuously fed alloy or mixed powder 2 for forming the dispersion alloy layer finally. This powder 2 is so applied through a powder feed tube 3 to the metallic base 1 as to have a predetermined width W at a right angle with respect to the moving direction P of the metallic base 1. On the other hand, a laser beam 4 is returned from a not-shown laser beam source by a return mirror 5 and is reflected by an oscillating mirror 6 so that it is focused to have a diameter of 0.5 to 5.0 mm at the powder 2 on the metallic base 1. In this optical system, the oscillating mirror 6 is vibrated within a predetermined angular range by a vibrating mechanism 7 such as a galvanometer so that the laser beam to be focused at the powder 2 on the metallic base 1 is reciprocated (or oscillated) with a frequency of 10 to 500 Hz in a direction perpendicular to the moving direction P of the metallic base 1, i.e., in the direction of the width W of the powder 2 on the metallic base 1.

The powder 2 on the metallic base 1, is melted, when irradiated with the laser beam 4, into a melt 9. This melt 9 is then agitated by oscillating the laser beam 4. When the agitated melt 9 is subsequently brought out of the position of the irradiation with the laser beam 4 as the metallic base 1 moves in the direction P, the melt 9 is quenched to solidify into a dispersion alloy layer 8 as a result of the heat transfer to the metallic base 1.

Here, this metallic base 1 to be used may be an arbitrary one such as an aluminum alloy, steels or various cast irons in accordance with the applications of or the required characteristics for the member products.

On the other hand, the alloy powder or mixed powder to be applied to the metallic base 1 is selected from the alloy systems which meet the following three requirements (a) to (c), as has been described hereinbefore:

(a) The powder should separate into two or more multi-liquid phases at a temperature not lower than its melting point. In other words, the liquid phases should not be uniformly mixed, even if they are abruptly heated to a temperature exceeding the melting point by the laser beam, but separated into the liquid phase or phases for forming the dispersion phase of the dispersion alloy layer and the liquid phase for forming the matrix.

(b) The individual liquid phases should separately solidify when quenched. In other words, the multiple liquid phases should remain separate immediately before the solidification.

(c) The ratio of the minimum to the maximum specific weight of those liquid phases, which will separately solidify, should be 0.3 or higher.

Such one of a variety of existing alloy systems as will form a hard phase as the dispersion phase is desirably selected so as to form a dispersion alloy layer having an excellent wear resistance. From this standpoint, it is desirable to select the alloy system which will form as the dispersion phase the phase of either a chemical compound of Fe, Ni, Cr and so on with Si, i.e., a silicide, a chemical compound of Fe and so on with C, i.e., a carbide, or a chemical compound of Fe and so on with B, i.e., boride, as will be exemplified in the Examples. With this composition, the liquid phase of the silicide, carbide or boride, which has been abruptly established by the irradiation with the laser beam, becomes separate from the liquid phase for the matrix and is quenched to solidify into the dispersion alloy layer in which the particles in the phase of the silicide, carbide or boride are dispersed in the matrix phase. The powder to be applied to the metallic base may be either that of the alloy itself having the composition for the above-specified alloy system or the mixed powder for preparing the composition of such alloy system.

In the embodiment of FIG. 1, the alloy or mixed powder 2 is applied to the metallic base 1 immediately before the irradiation with the laser beam 4. Despite of this fact, however, the powder may be poured directly into the portion being irradiated with the laser beam 4. In an alternative, the powder 2 may be prepared in advance into slurry or the like and applied to the metallic base.

EXAMPLES

EXAMPLE 1

The alloy powder used had a composition of Cu-Ni(15%)-Fe(8%)-Si(3%)-B(1.5%) and a particle diameter of −80 to +280 meshes. This alloy powder was applied to the metallic base of Al alloy (JIS AC-2C) and irradiated with the laser beam to form the dispersion alloy layer on the metallic base. The treating conditions were: the laser output of 2.8 KW; the beam diameter of 1.5 mm; the energy concentration of 1,600 W/mm$^2$; the oscillation width of 6 mm; the oscillation frequency of 200 Hz; and the bead proceeding velocity of 750 mm/min.

Figure 7:
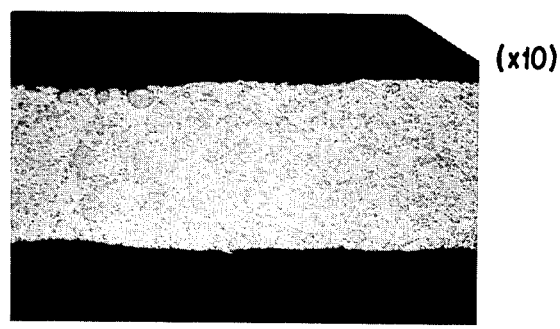

The photograph of the sectional structure obtained of the dispersion alloy layer is presented in FIG. 7. In this dispersion alloy layer, the particles (having a hardness of Hv=about 900) composed chiefly of silicide of of the system of Ni-Fe-Si having an average particle diameter of 45 um was dispersed in a volume content of about 7% in the Cu alloy matrix. Here, the specific weight of the dispersion phase or the silicide system of Ni-Fe-Si in the liquid phase was about 7, and the specific weight of the Cu alloy as the matrix phase was about 7.8. Their ratio could satisfy the range not lower than 0.3, which is defined in the present invention.

EXAMPLE 2

The mixed powder was prepared by mixing 10 wt. % of the powder of Fe$_3$C (cementite) with the powder of an alloy system of Cu-Ni(20%)-Si(3%)-Ti(0.5%). This mixed powder was treated by the laser beam to form the dispersion alloy layer on the metallic base of steel (S45C), as shown in FIG. 1. The alloy powder of Cu-Ni-Si-Ti used had a particle diameter of −80 to +280 meshes, and the powder of Fe$_3$C used had a particle diameter of −150 to +280 meshes. The treating conditions were: the laser output of 3.2 KW; the energy concentration of 2,800 W/mm$^2$; the beam diameter of 1.2 mm; the oscillation width of 6 mm; the oscillation frequency of 200 Hz; and the bead proceeding velocity of 600 mm/min.

Figure 8:
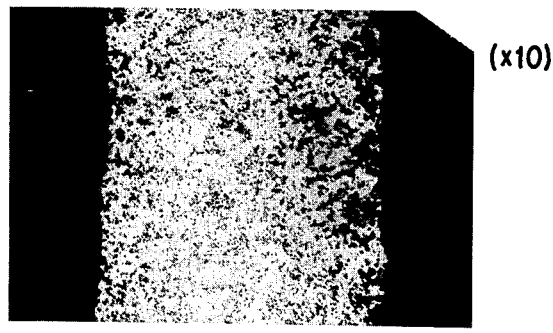

The photograph of the sectional structure obtained of the dispersion alloy layer is presented in FIG. 8. In this dispersion alloy layer, the silicide system (having a hardness of Hv=about 900) of Fe-Ni-Si having an average particle diameter of about 72 um and the carbide phase (having a hardness of Hv=about 1,200) were dispersed in a volume content of about 12% in the Cu alloy matrix. The specific weight of the silicide system of Fe-Ni-Si in the liquid phase was about 7, the specific weight of the carbide phase in the liquid phase was about 3.5, and the specific weight of the Cu alloy phase of the matrix in the liquid phase was about 7.8.

EXAMPLE 3

The mixed powder used was prepared by mixing 10 wt. % of the powder of an alloy of Fe-Cr(40%) with the powder of an alloy of Cu-Ni(15%)-Si(3%)-Al(1%)-B(2%). The mixed powder thus prepared was treated with a laser beam by the process shown in FIG. 1 to form the dispersion alloy layer on a metallic base of an Al alloy (AC2C). The powder of the Cu-Ni-Si-Al-B used had a particle diameter of −80 to +280 meshes, and the powder of the Fe-Cr alloy used had a particle diameter of −80 to +280 meshes. The treating conditions were: the laser output of 3.0 KW; the beam diameter of 2.0 mm; the energy concentration of 950 W/mm$^2$; the oscillation width of 6 mm; the oscillation frequency of 200 Hz; and the bead proceeding velocity of 600 mm/min.

Figure 9:
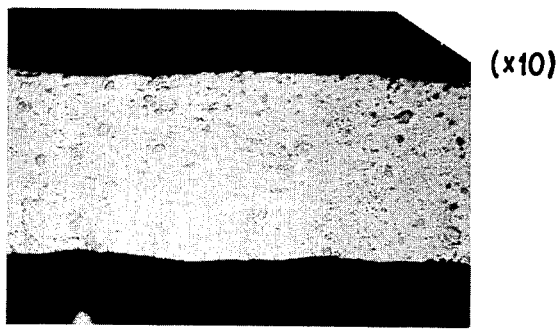
Figure 12:
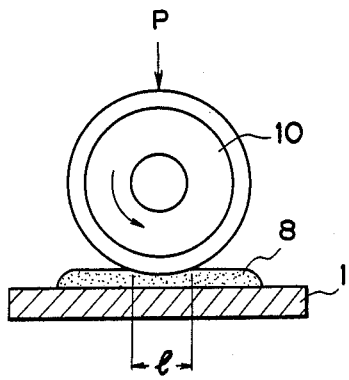
FIG. 12 is a schematic view illustrating the situation of the Ohgoshi type abrasion tester.

The photograph of the sectional structure obtained of the dispersion alloy layer is presented in FIG. 9. In this dispersion alloy layer, the particles (having a hardness of Hv=about 800) of complex phase of the silicide of a compound system of Ni-Cr-Fe-Si and the boride of a command system of Ni-Cr-Fe-B of an average diameter of 80 um was dispersed in a volume content of about 9% in the Cu alloy matrix.

EXAMPLE 4

The mixed powder used was prepared by mixing 20 wt. % of the powder (having a particle diameter of −80 to +350 meshes) of an alloy of Ni-Cr(30%)-Mo(8%)-C(2.5%)-Si(1%) with the powder (having a particle diameter of −80 to +280 meshes) of an alloy of Cu-Ni(15%)-Si(3%)-B(1.5%). The mixed powder thus prepared was treated with a laser beam by the method shown in FIG. 1 to form a dispersion alloy layer on a metallic base of S45C. The treating conditions were: the laser output of 3.2 KW; the beam diameter of 2.5 mm; the energy concentration of 1,600 W/mm; the oscillation width of 6 mm; the oscillation frequency of 300 Hz; and the bead proceeding velocity of 600 mm/min.

The photograph of the sectional structure obtained of the dispersion alloy layer is presented in FIG. 10. In this dispersion alloy layer, the particles of the Ni-base alloy having an average particle diameter of about 80 um were dispersed in an area content of about 15% in the Cu alloy matrix. The hardness of the dispersion phase of the Ni-based alloy had a hardness of Hv=about 800.

EXAMPLE 5

The mixed powder used was prepared by mixing 10 wt. % of the powder (having a particle diameter of −100 to +250 meshes) of an alloy (i.e., stellite alloy No. 6) of Co-Cr(25%)-W(8%)-C(1%)-Si(1%) with the powder (having a particle diameter of −80 to +280 meshes) of an alloy of Cu-Ni(15%)-B(1.5%). This mixed powder was treated by the method shown in FIG. 1 to form a dispersion alloy layer on a metallic base of S45C. The treating conditions were: the laser output of 3.2 KW; the beam diameter of 2.5 mm; the energy concentration of 650 W/mm$^2$; the oscillation width of 6 mm; the oscillation frequency of 200 Hz; and the beam proceeding velocity of 600 mm/min.

The photograph of the sectional structure obtained of the dispersion alloy layer is presented in FIG. 11. In this dispersion alloy layer, the Co-base alloy having an average particle diameter of 110 um was dispersed in an area content of 8% in the Cu alloy matrix. The dispersion phase had a hardness of Hv=about 750.

Abrasion Tests

The individual dispersion alloy layers formed in the foregoing Examples 1, 2 and 4 were subjected to abrasion tests to examine their sliding wears by means of the Ohgoshi type abrasion tester. In these tests, the width l of the wear dent was measured by rotating a rotor 10 of a hardened SKD material while the rotor 10 being pressed onto the dispersion alloy layer 8 on the metallic base 1. The measuring conditions were: the slip velocity of 0.3 m/sec; the slip distance of 100 m; and the final load of 10 Kg.

The results of the abrasion tests specified above are presented in FIG. 18 together with the results of wear resisting materials of the prior art such as an alloy of Cu-Ni(15%)-Si(3%)-B(1.5%) (which was made by the ordinary process) and a beryllium-copper alloy.

Figure 13:
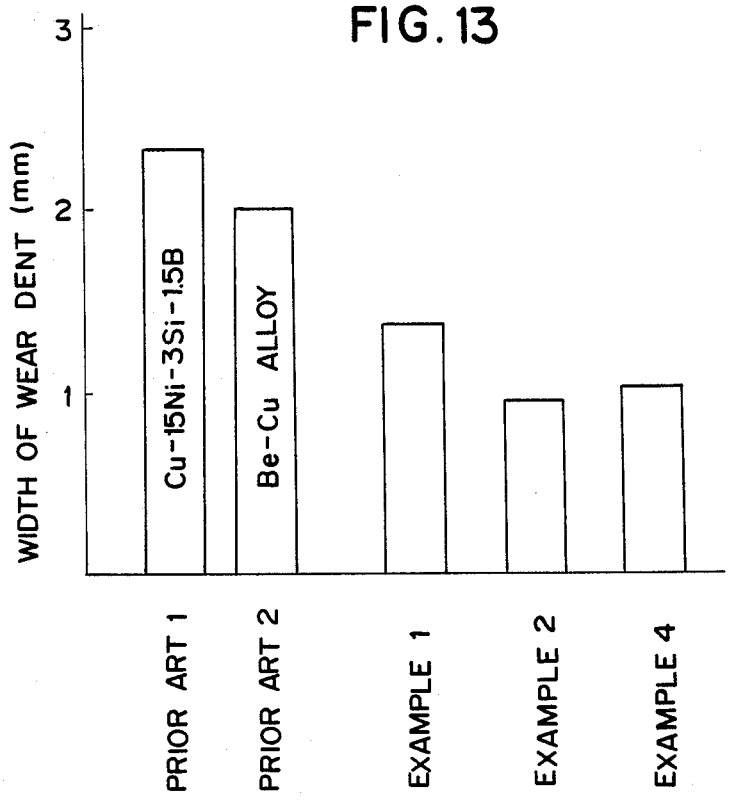
FIG. 13 is a graph plotting the results of the abrasion tests.

As is apparent from FIG. 13, all of the dispersion alloy layers made by the process of the present invention had remarkably excellent wear resistances to the sliding friction.

According to the process of the present invention, it is possible to form the dispersion alloy layer locally in the surface of the desired portion of the metallic base. Since the dispersion-phase particles of relatively large diameter, e.g., several tens microns can be formed, it is also possible to produce the dispersion alloy layer which has not only a high hardness but also a remarkably excellent wear resistance especially to the sliding friction. According to the process of the present invention, moreover, the dispersion alloy layer is formed as a cladding layer on the surface of the metallic base so that it can have an excellent wear resistance while being freed from any restriction upon the parent material (i.e., the metallic base). Furthermore, the size of the dispersion-phase particles can be controlled by changing the oscillation frequency and scanning rate of the laser beam so that the dispersion alloy layer to be formed can easily contain dispersion-phase particles having a size according to the application intended.

What is claimed is:

1. A process for forming a dispersion alloy layer on a metallic base, comprising the steps of:
    applying to a metallic base either an alloy powder made of an alloy system, which will separate into two or more multi-liquid phases at a temperature equal to or higher than its melting point and will solidify, when quenched, with its individual liquid phases being separate and in which the ratio of the minimum to the maximum specific weight of the separately solidifying liquid phases is 0.3 or higher, or a mixed powder which can compose said alloy system;
    irradiating the alloy or mixed powder on said metallic base with a laser beam to melt the same, while oscillating said laser beam with a frequency of 10 to 500 Hz in a direction generally perpendicular to a primary relative moving direction to agitate the melt of said alloy or mixed powder on said metallic base; and
    moving said laser beam in said primary relative moving direction relative to said metallic base to quench said melt to solidify at a quenching rate of $10^3$ deg/sec or higher thereby to form on said metallic base a dispersion alloy layer in which the solid particles of at least one of said phases are dispersed in the matrix of the remaining one of said phases.

2. A process according to claim 1, wherein said laser beam is focused to have a diameter ranging from 0.5 mm to 5.0 mm.

3. A process according to claim 1, wherein said laser beam has an energy concentration ranging from $1 \times 10^2$ $W/mm^2$ to $2 \times 10^4$ $W/mm^2$.

4. A process according to claim 1, wherein the relative moving velocity of said laser beam in said primary relative moving direction is set within a range of 450 to 2,000 mm/min.

5. A process according to claim 1, wherein said alloy system is a copper-based alloy.

6. A process according to claim 1, wherein said solid particles are selected from the group consisting of a silicide, a carbide and a boride.

* * * * *